US005477384A

United States Patent [19]
Nishikawa et al.

[11] Patent Number: 5,477,384
[45] Date of Patent: Dec. 19, 1995

[54] LASER OPTICAL DEVICE

[75] Inventors: Yukio Nishikawa, Ikeda; Yuji Uesugi, Osaka, both of Japan

[73] Assignee: Matsushita Electric Industrial Co., Ltd., Osaka, Japan

[21] Appl. No.: 271,744

[22] Filed: Jul. 7, 1994

Related U.S. Application Data

[62] Division of Ser. No. 941,170, Sep. 4, 1992, Pat. No. 5,365,374.

[30] Foreign Application Priority Data

Sep. 4, 1991 [JP] Japan .................................... 3-223870

[51] Int. Cl.$^6$ .............................. G02B 27/12; G02B 6/32
[52] U.S. Cl. ............................................. 359/619; 385/33
[58] Field of Search ...................................... 359/619, 626; 385/33, 35, 25; 430/945

[56] References Cited

U.S. PATENT DOCUMENTS

| | | | |
|---|---|---|---|
| 4,516,832 | 5/1985 | Jain ................................. | 359/20 |
| 4,795,227 | 1/1989 | Chande ............................ | 385/33 |
| 4,851,978 | 7/1989 | Ichihara ........................... | 362/268 |
| 4,918,583 | 4/1990 | Kudo et al. ...................... | 362/268 |
| 4,958,902 | 9/1990 | Ito .................................... | 385/33 |
| 4,961,622 | 10/1990 | Gorman ............................ | 385/33 |
| 4,993,809 | 2/1991 | Leib et al. ........................ | 350/321 |
| 5,016,964 | 5/1991 | Donnelly .......................... | 385/33 |
| 5,311,499 | 5/1994 | Hwang .............................. | 430/945 |
| 5,378,582 | 1/1995 | Chan ................................. | 430/945 |
| 5,396,571 | 3/1995 | Saadatmanesh ................... | 385/33 |
| 5,408,553 | 4/1995 | English ............................. | 385/33 |

Primary Examiner—Georgia Y. Epps
Assistant Examiner—Ricky Mack
Attorney, Agent, or Firm—Wenderoth, Lind & Ponack

[57] ABSTRACT

A laser optical device includes a laser oscillator, a beam shaping optical device for shaping a laser beam emitted from the oscillator to form a shaped laser beam, and a plurality of incidence lenses arranged to make the portions of the shaped laser beam incident on the incidence lenses equal. The device further includes beam transmitting optical fibers for receiving laser beams into which the laser beam passed through the incidence lenses is divided.

16 Claims, 3 Drawing Sheets

LASER OPTICAL DEVICE

This is a divisional application of Ser. No. 07/941,170, filed Sep. 4, 1992, now U.S. Pat. No. 5,365,374.

BACKGROUND OF THE INVENTION

The present invention relates to a laser optical device for making the quantity of incident laser beams equal.

It is generally known to divide the laser beam and transmit the divided laser beams through optical fibers when the laser beam is used particularly for simultaneous processing of many points, for example.

An example of a conventional laser optical device will be described below with reference to FIG. 6.

FIG. 6 is a structural diagram of a conventional laser optical device, more specifically, a four-way laser optical device designed to divide and feed the laser beam into four optical fibers.

In FIG. 6, reference numerals represent respectively: 21 a laser oscillator; 22 a laser beam; 23–25 half mirrors; 26–28 total reflection mirrors; 29 laser beams after being divided; 30 an incidence lens; and 31 an optical fiber. These optical parts are held by a fixed tool. The laser beam 22 projected from the laser oscillator 21 is divided in two by the half mirror 23 disposed 45° to the optical path. The divided laser beams are guided to the half mirror 24 and the total reflection mirror 26, respectively. In this manner, the laser beam 22 is eventually divided into four by the half mirrors 24, 25 and the total reflection mirrors 27, 28. Each diverged laser beam 29 is brought into the optical fiber 31 by the incidence lens 30 so as to be used for processing.

In the above-described arrangement, the intensity of laser beams after being diverged differs due to the reflecting characteristic of each mirror. A reflecting mirror having a multi-layered reflecting film generally has a variance in reflectivity of about ±5%. Therefore, when the laser beam is divided into four, the intensity can easily differ by an amount in the range of 20–30%.

SUMMARY OF THE INVENTION

The object of the present invention is therefore to provide a laser optical device capable of dividing a laser beam with uniform intensity and good accuracy.

In accomplishing these and other objects, according to one aspect of the present invention, there is provided a laser optical device comprising:

a laser oscillator;

a beam shaping optical means for shaping a laser beam emitted from the oscillator to form a shaped laser beam; and a plurality of incidence lenses arranged so that equal portions of the shaped laser beam are incident on the respective incidence lenses.

Since the incidence lenses are set at such positions or in such a configuration as to receive the equal amount of incident beams from the shaped laser beam, it becomes possible to divide the laser beam with uniform intensity and with good accuracy.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1A:
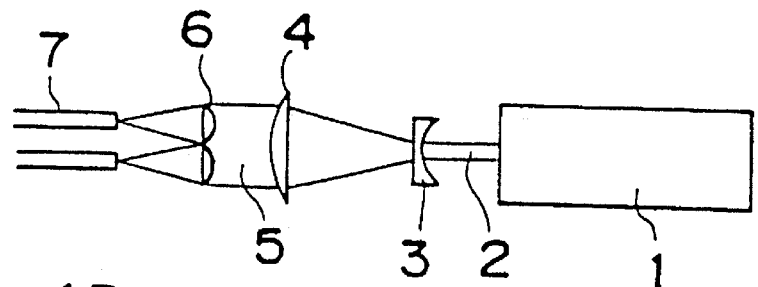
FIG. 1A is a structural diagram of a laser optical device according to a first embodiment of the present invention.

Before the description of the present invention proceeds, it is to be noted that like parts are designated by like reference numerals throughout the accompanying drawings.

The present invention will be discussed in a detailed manner with reference to the accompanying drawings hereinbelow.

Figure 1B:
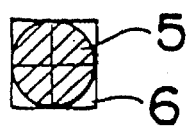
FIG. 1B is a cross-sectional view of the device of FIG. 1A.
Figure 5:
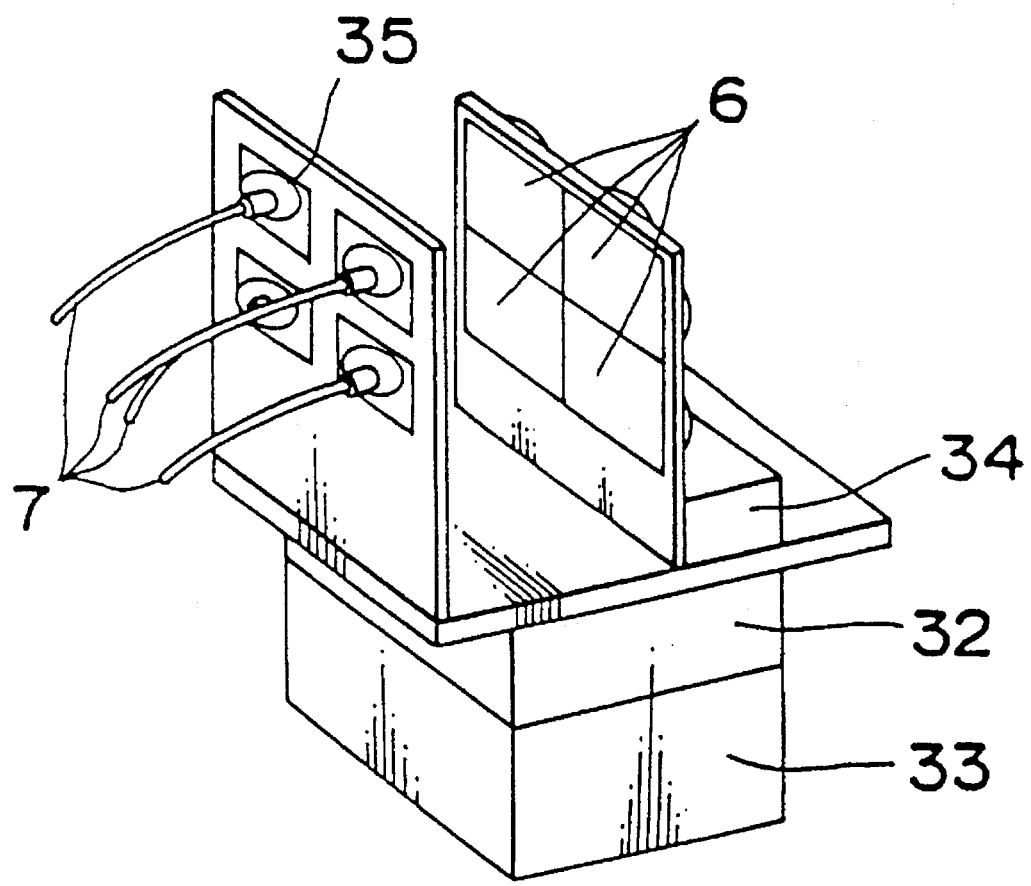
FIG. 5 is a perspective view showing moving mechanisms for moving incidence lenses and optical fibers in the first embodiment.

The structure of a laser optical device according to a first embodiment of the present invention will be described with reference to FIGS. 1A and 1B. In FIG. 1A, reference numeral 1 denotes a YAG laser oscillator 1. A concave lens 3, a convex lens 4, incidence lenses 6, and optical fibers 7 are held by a fixed tool. A laser beam 2 projected from the YAG laser oscillator 1 is shaped to be a parallel laser beam 5 magnified by the concave and convex lenses 3, 4. The magnified parallel laser beam 5 is incident on a group of incidence lenses 6 which are arranged in two rows and two columns as shown in the cross section of FIG. 1B. A portion marked with oblique lines in FIG. 1B is a cross section of the magnified laser beam 5. Although the incidence lenses 6 may be round, the magnified laser beam 5 can be utilized effectively when angular incidence lenses 6 are used. Whether the intensity distribution of the laser beam 2 is of the Gaussian mode or multi mode, if the irradiating area of the laser beam 5 to the incidence lenses 6 is adjusted spatially, the quantity (i.e. the quantity of radiant power) of the incident beam upon the optical fibers 7 can be made uniform. That is, the quantity (i.e. the quantity of radiant power) of the incident beam upon the optical fibers 7 is measured by measuring means such as a calorie-measuring device for indicating the quantity by Watt, which is called a "power meter", and then based on the measured result, the incidence lenses 6 are moved in an optical axis direction and a direction perpendicular to the optical axis direction to adjust the irradiating area. Specifically, as shown in FIG. 5, reference numeral 32 denotes a transversely driving mechanism for moving the incident lenses 6 and the optical fibers 7 in the direction perpendicular to the optical axis direction, reference numeral 33 denotes a vertically driving mechanism for vertically moving the incident lenses 6 and the optical fibers 7, reference numeral 34 denotes axially driving mechanism for moving the incident lenses 6 in the optical axis direction, and reference numeral 35 denotes receptacle for fixing the optical fiber 7 thereonto. The movement of the transversely driving mechanism 32 and the vertically driving mechanism 33 allows the incident lenses 6 to receive uniform quantities of the laser beams. In the axial (optical axis) direction, the focus position of the incident lenses 7 is adjusted by the axially driving mechanism 34. The optical fibers 7 are moved on the surface fixed by the receptacle 35 to position the optical fibers 7 at focus positions. Moreover, in this embodiment and other embodiments described later when a lens the spherical aberration of which has been corrected is used as the incidence lens 6, the condensing efficiency is improved, and the laser beams can even be brought effectively into even an optical fiber of a small diameter.

Figure 2A:
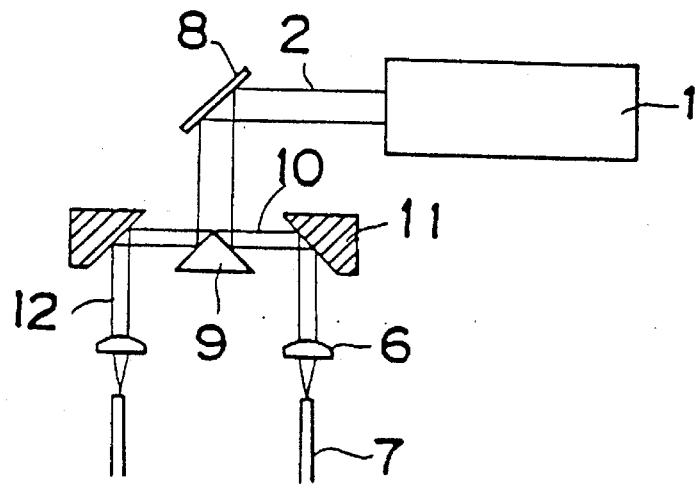
FIG. 2A is a structural diagram of a laser optical device according to a second embodiment of the present invention.
Figure 2B:
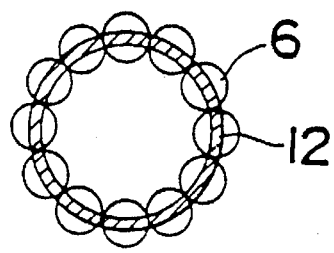
FIG. 2B is a cross-sectional view of the device of FIG. 2A.

A laser optical device according to a second embodiment of the present invention will be described with reference to a structural diagram of FIG. 2. In FIG. 2A, reference numerals denote respectively: 8 a reflecting mirror; 9 a conical mirror; 10 a radial laser beam; 11 a conical internal mirror; and 12 a ring-shaped laser beam. The optical parts are supported by a fixed tool. The laser beam 2 generated from the YAG laser oscillator 1 is introduced by the reflecting mirror 8 to the conical mirror 9. At this time, when the laser beam 2 is incident on the conical mirror 9 so that the center of the laser beam 2 is incident on a top of the conical mirror 9, the reflected laser beam 2 is spread radially as the radial laser beam 10. The laser beam 10 is further reflected by the conical internal mirror 11 and thus shaped as a ring-shaped laser beam. Particularly, in the case where the conical mirror 9 is inclined 45° to the conical internal mirror 11, the ring-shaped laser beam 12 becomes a parallel beam. As shown in the cross sectional view of FIG. 2B, when the ring-shaped laser beam 12 is irradiated onto the incidence lenses 6 aligned in a circle, if the positions of the lenses 6 are adjusted so as to receive the same irradiating area by the laser beam 12, the quantity of beam incident upon each of the optical fibers 7 provided below the incidence lenses 6 becomes equal.

Figure 3:
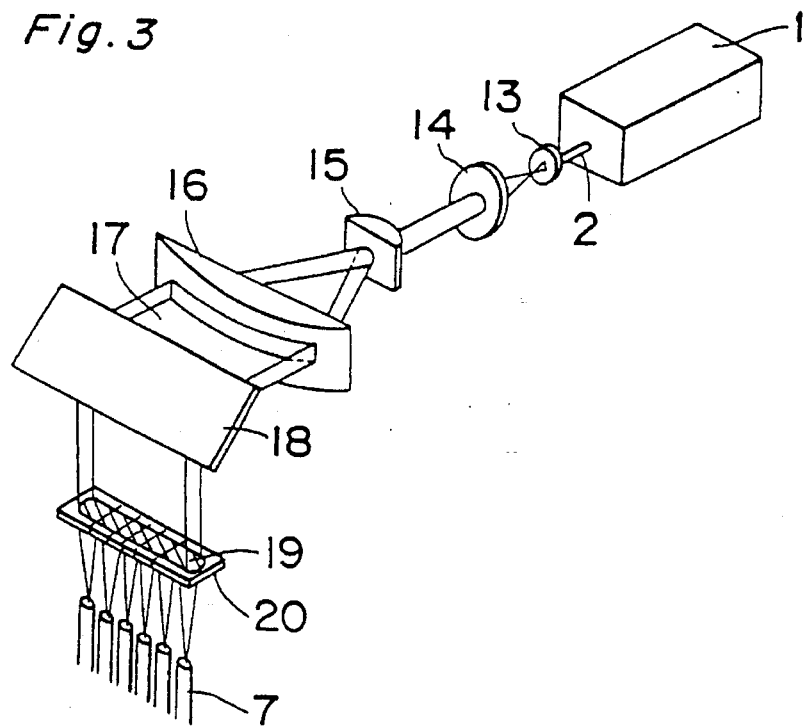
FIG. 3 is a structural diagram of a laser optical device according to a third embodiment of the present invention.

FIG. 3 shows the structure of a laser optical device according to a third embodiment of the present invention, wherein reference numerals indicate respectively: 13, 14 magnifying convex lenses; 15, 16 uniaxial magnifying cylindrical lenses; 17 a laser beam after being magnified and shaped; 18 a reflecting mirror; 19 an incidence lens to make the beam incident onto the fiber; and 20 a glass plate having the incidence lens 19 adhered thereto. These optical components are held by a fixed tool. The laser beam 2 projected from the YAG laser oscillator 1 is magnified by the convex lenses 13, 14, and magnified further by the cylindrical lenses 15, 16 in one axial direction to form the laser beam 17. The laser beam 17 is reflected by the reflecting mirror 18 to the incidence lenses 19 adhered to the glass plate 20. As a result, the laser beams enter the optical fibers 7.

Figure 4:
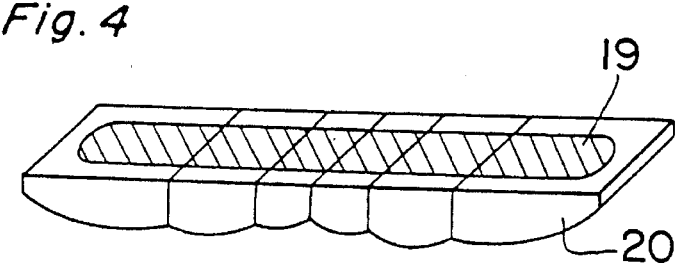
FIG. 4 is an enlarged view of a lens section for guiding a laser beam to an optical fiber in the third embodiment of the present invention.
Figure 6:
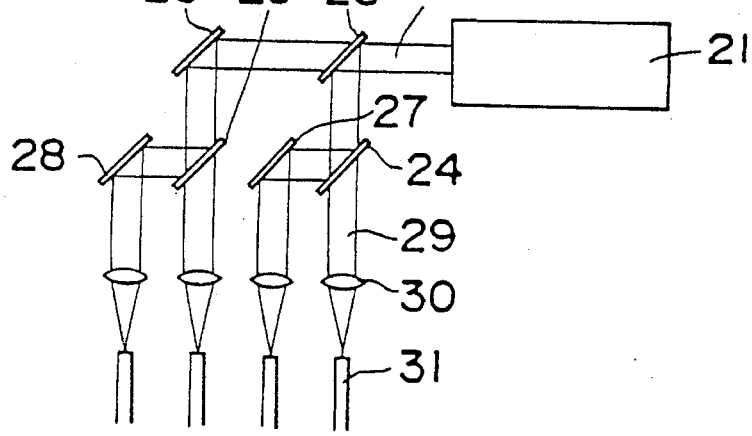
FIG. 6 is a structural diagram of a conventional four-way laser optical device.

Moreover, in the case where the intensity distribution of the laser beams is not uniform, if the size of the incidence lenses 19 is adjusted as shown in FIG. 4, the laser beams enter the optical fibers 7 in uniform quantity.

It is needless to say that the present laser optical device may be used directly for processing after the laser beam is divided, without using the optical fibers.

As described hereinabove, the laser optical device of the present invention is provided with the laser oscillator, the beam shaping optical device, and a plurality of incidence lenses arranged so as to make the quantity of incident laser beams passed through the beam shaping optical device equal. Accordingly, the laser optical device can divide the laser beam with uniform intensity and with good accuracy.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A laser optical device comprising:

a laser oscillator;

a beam shaping optical means for shaping a laser beam emitted from said oscillator to form a shaped laser beam;

a plurality of incidence lenses arranged in such a manner as to respectively receive equal quantities of radiant power from said shaped laser beam;

wherein said beam shaping optical means is operable to shape the laser beam emitted from said oscillator into a shape having a ring-shaped cross section; and wherein said incidence lenses are arranged in an annular configuration such that, when the laser beam is emitted from said oscillator, an equal portion of said ring-shaped cross section of the shaped laser beam is incident on each of said incidence lenses.

2. The laser optical device as claimed in claim 1, further comprising beam transmitting optical fibers for respectively receiving said equal quantities of radiant power respectively focused on said locations by said incidence lenses.

3. The laser optical device as claimed in claim 2, wherein said incidence lenses comprise means for correcting spherical aberration, and for causing portions of said shaped laser beam to be incident on said beam transmitting optical fibers, respectively.

4. The laser optical device as claimed in claim 1, wherein said incidence lenses comprise means for correcting spherical aberration.

5. The laser optical device as claimed in claim 1, wherein said beam shaping optical means comprises a first mirror for receiving the laser beam emitted from said laser oscillator and spreading the laser beam radially, and a second mirror for receiving the radially spread laser beam and reflecting and shaping the radially spread laser beam into the shape having the ring-shaped cross section.

6. The laser optical device as claimed in claim 5, wherein said first mirror comprises a conical mirror; and said second mirror comprises a conical internal mirror.

7. The laser optical device as claimed in claim 5, wherein said first mirror comprises a conical mirror having an exterior wall inclined relative to an optical axis of the laser beam emitted from said laser oscillator; and said second mirror comprises an annular mirror disposed about said first mirror and having interior walls inclined relative to the optical axis of the laser beam emitted from said laser oscillator.

8. A laser optical device comprising:

a laser oscillator;

a beam shaping optical means for shaping a laser beam emitted from said oscillator to form a shaped laser beam;

a plurality of incidence lenses arranged in such a manner as to respectively receive equal quantities of radiant power from said shaped laser beam;

wherein said beam shaping optical means is operable to shape the laser beam emitted from said oscillator into a shape having an elongated cross section; and wherein said incidence lenses are arranged in an elongated configuration and have respective surface areas which vary depending on their location along said elongated configuration.

9. The laser optical device as claimed in claim 8, further comprising beam transmitting optical fibers for respectively receiving said equal quantities of radiant power respectively focused on said locations by said incidence lenses.

10. The laser optical device as claimed in claim 9, wherein said incidence lenses for correcting spherical aberration, and for causing portions of said shaped laser beam to be incident on said beam transmitting optical fibers, respectively.

11. The laser optical device as claimed in claim 8, wherein said incidence lenses comprise means for correcting spherical aberration.

12. The laser optical device as claimed in claim 8, wherein said beam shaping optical means comprises at least one convex lens for magnifying the laser beam emitted by said laser oscillator, and cylindrical lenses for shaping the magnified laser beam into the shape having the elongated cross section.

13. The laser optical device as claimed in claim 8, wherein said surface areas of said incidence lenses, respectively, increase from a longitudinal center of the elongated cross section toward opposing ends thereof.

14. A laser optical device comprising:

a laser oscillator;

a beam shaping optical means for shaping a laser beam emitted from said oscillator to form a shaped laser beam;

a plurality of beam transmitting optical fibers provided at a plurality of locations, respectively;

a plurality of incidence lenses arranged in such a manner as to respectively receive equal quantities of radiant power from said shaped laser beam;

wherein said incidence lenses constitute means for focusing said equal quantities of radiant power on said locations, respectively, and for correcting spherical aberration, such that each of said incidence lenses constitutes an incidence lens of an individual one of said optical fibers; and wherein said plurality of incidence lenses are arranged so as to together receive substantially all radiant power of said shaped laser beam.

15. The laser optical device as claimed in claim 14, wherein said beam shaping optical means is operable to shape the laser beam emitted from said oscillator into a shape having a ring-shaped cross section; and said incidence lenses are arranged in an annular configuration such that, when the laser beam is emitted from said oscillator, an equal portion of said ring-shaped cross section of the shaped laser beam is incident on each of said incidence lenses.

16. The laser optical device as claimed in claim 14, wherein said beam shaping optical means is operable to shape the laser beam emitted from said oscillator into a shape having an elongated cross section; and said incidence lenses are arranged in an elongated configuration and have respective surface areas which vary depending on their location along said elongated configuration.

* * * * *